US012696330B2

(12) United States Patent (10) Patent No.: US 12,696,330 B2
Ren et al. (45) Date of Patent: Jul. 28, 2026

(54) SELECTION OF TRANSMITTED VIRTUAL ACCESS POINT FOR MULTIPLE BASIC SERVICE SET IDENTIFIER GROUPS

(71) Applicant: HEWLETT PACKARD ENTERPRISE DEVELOPMENT LP, Spring, TX (US)

(72) Inventors: Zhijun Ren, Beijing (CN); Chunfeng Wang, Beijing (CN); Jinzhao Ren, Beijing (CN); Yue Han, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 312 days.

(21) Appl. No.: 18/449,328

(22) Filed: Aug. 14, 2023

(65) Prior Publication Data

US 2025/0063613 A1    Feb. 20, 2025

(51) Int. Cl.
| | |
|---|---|
| *H04W 76/12* | (2018.01) |
| *H04W 48/16* | (2009.01) |
| *H04W 72/542* | (2023.01) |
| *H04W 88/08* | (2009.01) |

(52) U.S. Cl.
CPC ........... *H04W 76/12* (2018.02); *H04W 48/16* (2013.01); *H04W 72/542* (2023.01); *H04W 88/08* (2013.01)

(58) Field of Classification Search
CPC ... H04W 76/12; H04W 48/16; H04W 72/542; H04W 88/08; H04W 84/12
See application file for complete search history.

(56) References Cited

U.S. PATENT DOCUMENTS

| | | | |
|---|---|---|---|
| 9,955,396 | B1 | 4/2018 | Heinz |
| 10,009,280 | B2 | 6/2018 | Weitzman et al. |
| 10,681,677 | B2 | 6/2020 | Ghosh et al. |
| 10,715,223 | B2 | 7/2020 | Alpert et al. |
| 11,375,451 | B2 | 6/2022 | Dakshinkar et al. |
| 12,232,018 | B2 * | 2/2025 | Veerabudran ......... H04W 48/10 |
| 2016/0205593 | A1 | 7/2016 | Kauppinen et al. |
| 2016/0374078 | A1 | 12/2016 | Ghosh et al. |
| 2020/0120711 | A1 | 4/2020 | Sevin et al. |
| 2020/0359259 | A1 | 11/2020 | Patil et al. |
| 2021/0282020 | A1 | 9/2021 | Barton et al. |

* cited by examiner

*Primary Examiner* — Diane D Mizrahi
(74) *Attorney, Agent, or Firm* — Hewlett Packard Enterprise Patent Department

(57) ABSTRACT

In implementations of the present disclosure, there is provided an approach for reducing unnecessary network down. A method comprises determining a plurality of virtual access points (VAPs) of the AP in a radio frequency (RF) band. Then, the plurality of VAPs are divided into a plurality of VAP zones based on a set of data forwarding entities corresponding to overlay VAPs in the plurality of VAPs, and the plurality of VAP zones includes a bridge zone and one or more overlay zones. A VAP is selected from the bridge zone for allocation to an MBSSID group of a set of MBSSID groups for the plurality of VAPs as a transmitted VAP (TX-VAP). The TX-VAP is used to transmit a beacon frame for the MBSSID group. Implementations of the present disclosure can help the AP to reduce unnecessary network down caused by data tunnel broken and limit the negative network impact.

20 Claims, 8 Drawing Sheets

400

402

AP

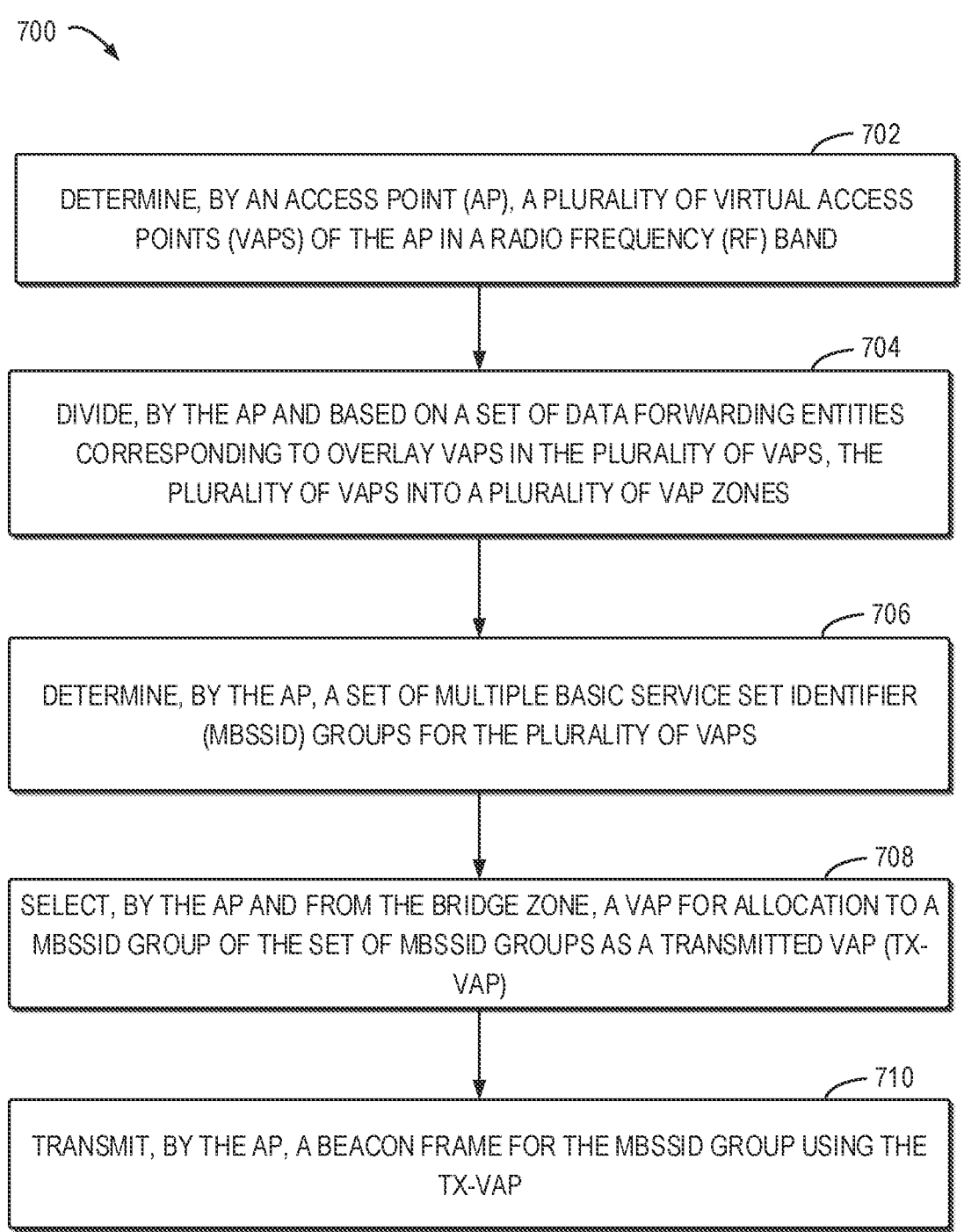

700

702
DETERMINE, BY AN ACCESS POINT (AP), A PLURALITY OF VIRTUAL ACCESS POINTS (VAPS) OF THE AP IN A RADIO FREQUENCY (RF) BAND

704
DIVIDE, BY THE AP AND BASED ON A SET OF DATA FORWARDING ENTITIES CORRESPONDING TO OVERLAY VAPS IN THE PLURALITY OF VAPS, THE PLURALITY OF VAPS INTO A PLURALITY OF VAP ZONES

706
DETERMINE, BY THE AP, A SET OF MULTIPLE BASIC SERVICE SET IDENTIFIER (MBSSID) GROUPS FOR THE PLURALITY OF VAPS

708
SELECT, BY THE AP AND FROM THE BRIDGE ZONE, A VAP FOR ALLOCATION TO A MBSSID GROUP OF THE SET OF MBSSID GROUPS AS A TRANSMITTED VAP (TX-VAP)

710
TRANSMIT, BY THE AP, A BEACON FRAME FOR THE MBSSID GROUP USING THE TX-VAP

*FIG. 7*

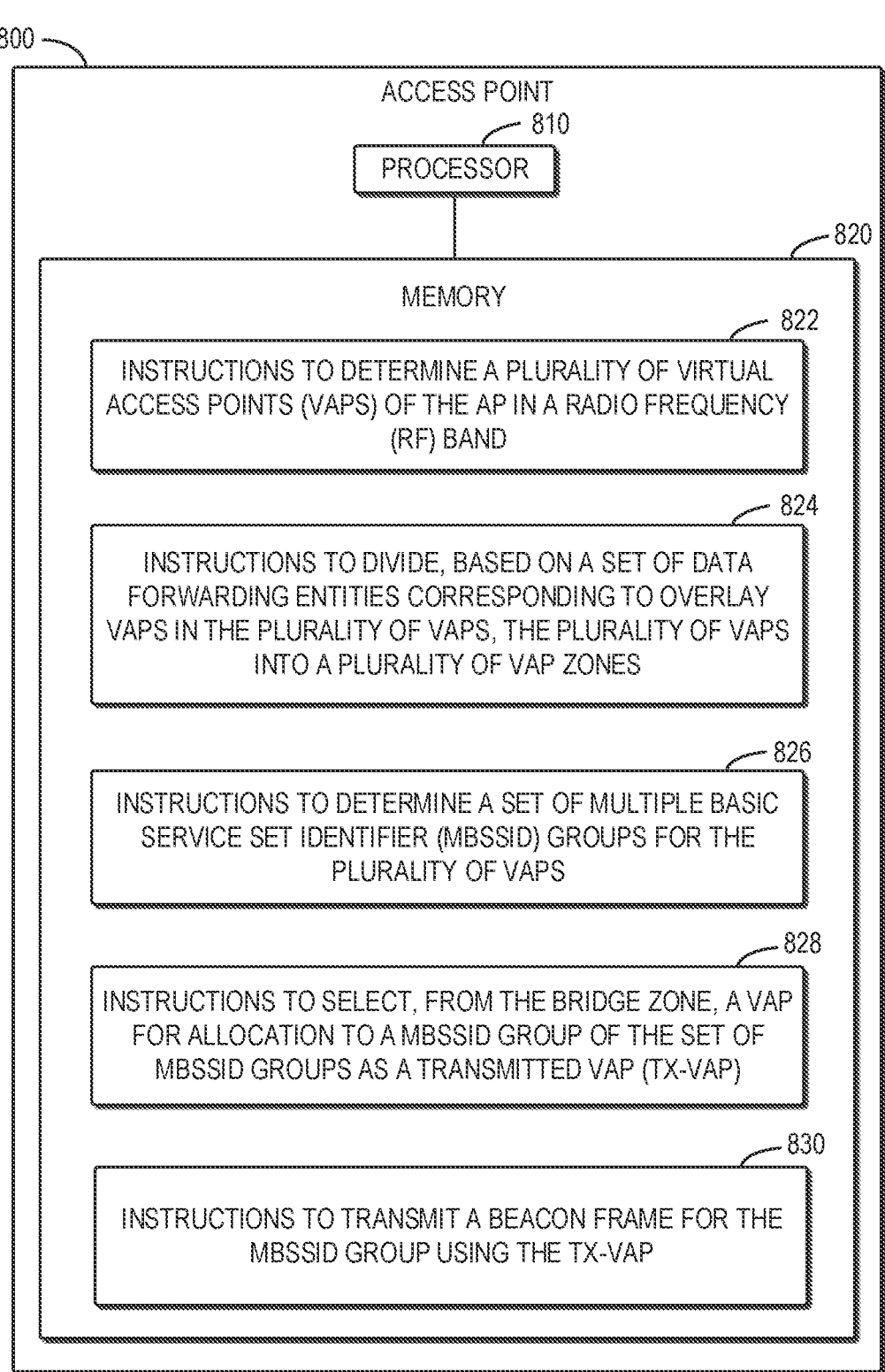

800

ACCESS POINT

810

PROCESSOR

820

MEMORY

822

INSTRUCTIONS TO DETERMINE A PLURALITY OF VIRTUAL ACCESS POINTS (VAPS) OF THE AP IN A RADIO FREQUENCY (RF) BAND

824

INSTRUCTIONS TO DIVIDE, BASED ON A SET OF DATA FORWARDING ENTITIES CORRESPONDING TO OVERLAY VAPS IN THE PLURALITY OF VAPS, THE PLURALITY OF VAPS INTO A PLURALITY OF VAP ZONES

826

INSTRUCTIONS TO DETERMINE A SET OF MULTIPLE BASIC SERVICE SET IDENTIFIER (MBSSID) GROUPS FOR THE PLURALITY OF VAPS

828

INSTRUCTIONS TO SELECT, FROM THE BRIDGE ZONE, A VAP FOR ALLOCATION TO A MBSSID GROUP OF THE SET OF MBSSID GROUPS AS A TRANSMITTED VAP (TX-VAP)

830

INSTRUCTIONS TO TRANSMIT A BEACON FRAME FOR THE MBSSID GROUP USING THE TX-VAP

*FIG. 8*

SELECTION OF TRANSMITTED VIRTUAL ACCESS POINT FOR MULTIPLE BASIC SERVICE SET IDENTIFIER GROUPS

BACKGROUND

An access point (AP) may create several networks on the same Wi-Fi radio band by bringing up several Virtual Aps (VAPs). For each of the several VAPs, a beacon frame is transmitted by the VAP to announce a wireless network every 100 milliseconds. When the number of networks increases, the airtime consumed by beacon frames also increases. Moreover, the beacon frames are usually transmitted at lower data rates. Therefore, beacon frames of several networks will consume more airtime than other frames of similar size sent at higher data rates.

In order to improve airtime efficiency, a multiple basic service set Identifier (MBSSID) element is used. AN MBSSID is a key feature of Wi-Fi technology for improving airtime efficiency and allows several basic service set identifiers (BSSIDs) being nested in a single 802.11 beacon frame or a probe response. The radio frequency (RF) performance gets improved a lot as 802.11 beacon frames or probe responses are dramatically reduced in this way.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

FIG. 7 illustrates a flow chart of an example method for selecting TX-VAPs for MBSSID groups according to implementations of the present disclosure; and FIG. 8 illustrates an example access point according to implementations of the present disclosure.

DETAILED DESCRIPTION

Figure 1:
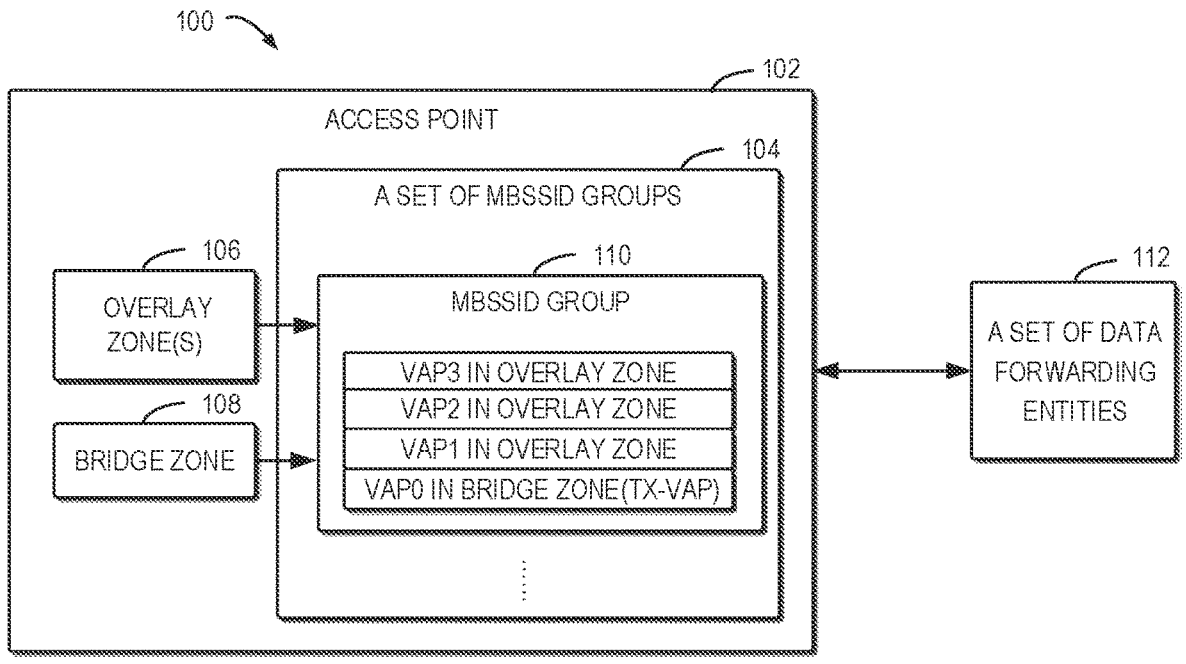
FIG. 1 illustrates a block diagram of an example environment in which reference implementations of the present disclosure may be implemented.

As discussed above, the MBSSID is a key feature of Wi-Fi technology for improving airtime efficiency. It allows several BSSIDs to be nested in a single 802.11 beacon or probe response. RF performance gets improved a lot as 802.11 beacon and probe response are dramatically reduced in this way. The VAP which advertises 802.11 beacon frame and probe response on behalf of itself and other VAPs in an MBSSID group, is called TX-VAP. Furthermore, the other VAPs in the same MBSSID group are called non-TX-VAP. If a non-TX-VAP goes down, it only has an impact on itself. However, if a TX-VAP goes down, the MBSSID group must be reconstructed without taking previous TX-VAP into account, all related non-TX-VAPs must be rebuilt and all related stations (STAs) will get disconnected.

An overlay or tunneled VAP is widely deployed in customers' network. Different overlay or tunneled VAPs send data to different data forwarding entities. The overlay or tunneled VAP communicates with a data forwarding entity by using a data tunnel. The data tunnel could be broken for many reasons, such as data forwarding entity upgrading, movement from one configuration group to another, network issues between an AP and the data forwarding entity, etc. If the data tunnel is broken between the AP and the data forwarding entity, the overlay or tunneled VAP needs to be brought down, as the VAP cannot serve STAs anymore in such a situation. If the overlay or tunneled VAP is the right TX-VAP in an MBBISD group, all VAPs in the same group will get impacted. By comparison, if the overlay or tunneled VAP is a non-TX-VAP, only this VAP gets impacted when the data tunnel is broken.

For example, An AP has three VAPs which belong to a same MBSSID group. The three VAPs include a bridge VAP, a first overlay VAP connecting to a first data forwarding entity through a first data tunnel, and a second overlay VAP connecting to a second data forwarding entity through a second data tunnel. For the bridge VAP, all station traffic is bridged or routed locally in the AP without an extra data forwarding entity involved. Therefore, everything works fine when any data tunnels are broken if the bridge VAP is a TX-VAP in the MBSSID group. If the first overlay VAP is the TX-VAP in the MBSSID group, it advertises beacons on behalf of itself, the bridge VAP and the second overlay VAP. By accident, the first data tunnel between the first overlay VAP and the first data forwarding entity is broken, then the first overlay VAP1 will be brought down. Because the first overlay VAP is the TX-VAP in the MBBID group, larger network down happens unnecessarily. For example, the bridge VAP will flap unnecessarily as traffic forwarding for stations connecting to this VAP does not involve the first data forwarding entity. Moreover, the second overlay VAP2 will flap unnecessarily as traffic forwarding for stations connecting to this VAP does not involve the first data forwarding entity.

Therefore, implementations of the present disclosure propose a solution of selecting a TX-VAP for MBBID groups to maintain network stability. According to implementations of the present disclosure, an AP determines a plurality of VAPs of the AP in an RF band and divides the plurality of VAPs into a plurality of VAP zones based on a set of data forwarding entities. The plurality of VAP zones includes a bridge zone and one or more overlay zones. Traffic of STAs which connects to VAPs in the bridge zone is forwarded within AP self, and traffic of STAs which connects to VAPs in each overlay zone would be forwarded to a corresponding data forwarding entry. The AP further determines a set of MBSSID groups for the plurality of VAPs. Then, a VAP may be selected from the bridge zone for allocation to an MBSSID group of the set of MBSSID groups as a TX-VAP. The TX-VAP can be used to transmit a beacon frame for the MBSSID group. Therefore, implementations of the present disclosure may use a bridge VAP as a TX-VAP of an MBSSID group. For the bridge VAP, all STA traffic is bridged or routed locally in AP without an extra data forwarding entity involved. Therefore, everything works fine and the network remains stability when any data tunnels to data forwarding entities are broken.

Other advantages of implementations of the present disclosure will be described with reference to the reference implementation as described below. Reference is made below to FIG. 1 through FIG. 8 to illustrate basic principles and several reference implementations of the present disclosure herein.

FIG. 1 shows a block diagram of an example environment in which reference implementations of the present disclosure may be implemented. In FIG. 1, an AP 102 communicates with a set of data forwarding entities 112. For example, a data forwarding entity of the set of data forwarding entities 112 could be a mobility controller, a branch gateway (GW), or a virtual private network concentrator (VPNC). The data forwarding entity is set up for data bridging, routing, and firewall policy application.

In the implementations of FIG. 1, the AP 102 includes a plurality of VAPs. The plurality of VAPs may include one or more bridge VAPs, and one or more overlay or tunneled VAPs. For a bridge VAP, all STA traffic is bridged or routed locally in AP without an extra data forwarding entity involved. For an overlay/tunneled VAP, all STA traffic is sent to a data forwarding entity for bridging, routing and policy application, so a data tunnel is needed between the overlay VAP and the data forwarding entity. Additionally, the AP 102 also may include one or more split VAPs. A split VAP tunnels a part of traffic to a data forwarding entity and forwards the rest of traffic from a local uplink without involving a data forwarding entity. For this kind of VAP, when a data tunnel between the AP and the data forwarding entity is down, the VAP could stay up or tear down. Because in such a situation, traffic required to be forwarded by the data forwarding entity cannot pass. However, traffic that is forwarded locally still can pass, so it depends on a configuration to stay it up or tear it down.

The AP 102 may divide the plurality of VAPs into a plurality of VAP zones, which includes overlay zone(s) 106 and a bridge zone 108. The dividing is based on the set of data forwarding entities 112. For example, if a VAP forwards its STAs' traffic within the AP 102 self and without data forwarding entity involved, it is a bridge VAP and assigned to the bridge zone. Each of the overlay zone(s) 106 corresponds to a data forwarding entity of the set of data forwarding entities. When an Overlay or tunneled VAP in the AP communicates with a data forwarding entity, the overlay or tunneled VAP is assigned to the overlay zone corresponding to the data forwarding entity. Particularly, the configuration information of the VAP can be used to determine whether the VAP communicates with a data forwarding entity and obtain an identifier of the data forwarding entity. Additionally or alternatively, the split VAP may be assigned to the bridge zone or the overlay zone based on the configuration. If the configuration of the split VAP indicates that the split VAP will be torn down when the data tunnel for the split VAP is down, the split VAP may be assigned to the overlay zone. If the configuration of the split VAP indicates that the split VAP will stay up when the data tunnel for the split VAP is down, the split VAP may be assigned to the bridge zone 108 based on the configuration for the split VAP.

In some implementations, the split VAP may be determined from the configuration of the VAP. For example, the configuration of the VAP includes an identifier of a data forwarding entity and indicates that a part of traffic is tunneled to the data forwarding entity. The configuration also includes some information which indicates forwarding the rest of traffic from a local uplink without involving a data forwarding entity. In some implementations, the split VAP may be determined by the topological structure of arrangement of the VAP and the data forwarding entity. The above implementations are provided for purposes of illustration rather than limitation. The split VAP can be determined in any suitable way.

The AP 102 may generate a set of MBSSID groups 104. The set of MBSSID groups 104 includes one or more MBSSID groups, such as an MBSSID group 110. Each MBSSID group includes several VAPs, for example, 4 VAPs. One of the several VAPs in an MBSSID group is selected as TX-VAP. In the present disclosure, the VAPs in the bridge zone 108 and the overlay zone(s) 106 may be assigned to each of the set of MBSSID groups 104. For example, VAP0 in the bridge zone 108 and VAP1, VAP2, VAP3 in an overlay zone are assigned to the MBSSID group 110. Because the VAP from bridge zone can work well even if any of the set of data forwarding entities 112 is down, the VAP from bridge zone is selected as the TX-VAP due to its stability.

In some implementations, each of the set of MBSSID groups 104 has a VAP from the bridge zone 108 as the TX-VAP. In some implementations, the set of MBSSID groups 104 also includes another MBSSID group which does not include a VAP from the bridge zone 108. If all the VAPs in another MBSSID group are from the same overlay zone, any of the VAPs may be used as the TX-VAP. If all the VAPs in another MBSSID group are from the different overlay zones, the TX-VAP is a VAP from the overlay zone, which has the maximum number of VAPs in the MBSSID group. FIG. 1 shows that the AP 102 includes the bridge zone 108 and the MBSSID group 110 for purposes of illustration rather than limitation. The AP 110 may not include the bridge zone 108, and the set of MBSSID groups may not include an MBSSID group in which the TX-VAP is a VAP from the bridge zone 108.

Figure 2:
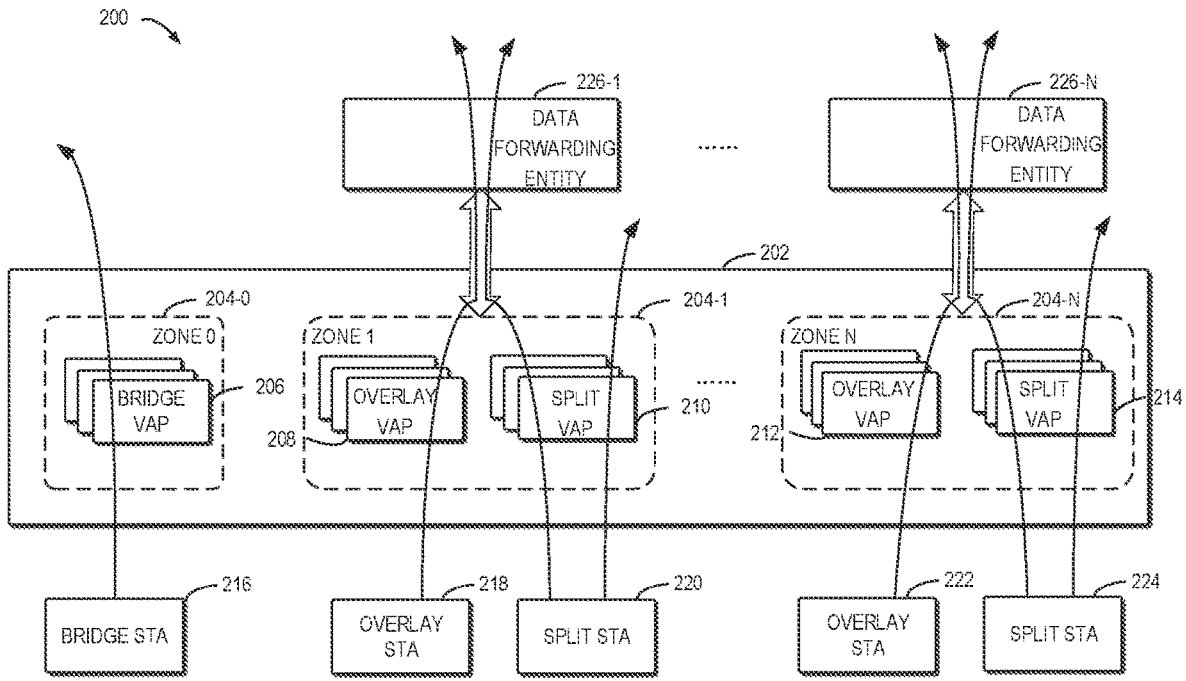
FIG. 2 illustrates an example of segmenting VAPs in each RF band according to implementations of the present disclosure.

FIG. 2 illustrates an example 200 for segmenting VAPs in each RF band according to implementations of the present disclosure. In FIG. 2, VAPs in each RF band are segmented according to different data forwarding entities. The VAPs are divided into distinct groups, and each group may be referred to as a zone. All VAPs in the same zone tunnel traffic to a same data forwarding entity, so when the data tunnel between the AP and the data forwarding entity is down, these VAPs will get a same impact.

As shown in FIG. 2, an AP 202 communicates with a data forwarding entity 226-1, . . . , a data forwarding entity 226-N, which are collectively referred to as data forwarding entities 226, where N is integer. Based on the data forwarding entities 226, the AP 202 divides all the VAPs of the AP 202 in a radio frequency (RF) band into different zones, for example, zone 204-0, zone 204-1, . . . , zone 204-N, also referred to as zone 0, zone 1, . . . , zone N. Moreover, zone 0 is the bridge zone, and zone 1, . . . , zone N are the overlay zones. For example, the dividing for the VAPs may be based on the identifiers of the data forwarding entities 226 in the configurations for the VAPs.

Bridge VAPs, overlay or tunneled VAPs, and split VAPs are configured by customers to serve different STAs with different requirements. In FIG. 2, all bridge VAPs are grouped into zone 0, and no data forwarding entity is involved for data forwarding in this zone. All overlay VAPs that tunnel traffic to a same data forwarding entity are grouped in a same zone, and the zone number could be from 1 to n. There are some split VAPs which tunnel a part of traffic to a data forwarding entity and forward the rest of traffic from local uplinks without involving the data forwarding entity. In the example of FIG. 2, the split VAPs are allocated to corresponding zones without further adjustments.

For example, zone 204-0 includes several bridge VAPs, for example a bridge VAP 206. The bridge VAP 206 is used by the bridge STA 216 to bridge or route all STA traffic locally in the AP 202 without an extra data forwarding entity. Zone 1 includes several overlay VAPs and several split VAPs, for example an overlay VAP 208 and a split VAP 210. Zone 1 corresponds to the data forwarding entity 226-1, which means the overlay VAPs and the split VAPs in the Zone1 communicate with the data forwarding entity 226-1, and all the STA traffic of an overlay STA 218 and/or a part of the traffic of a split STA 220 needs to be sent to the data forwarding entity 226-1 for bridging, routing and policy applying through the data tunnel between zone1 and the data forwarding entity 226-1. For the split VAPs in the zone1, the rest of traffic of the split STA is bridged or routed locally in AP without the extra data forwarding entity. The zone N also includes overlay VAPs and split VAPs, which includes an overlay VAP 212 and a split VAP 214. All the traffic of the overlay STA 222 and/or a part of traffic of the split VAP 224 need to be sent to the data forwarding entity 226-N for bridging, routing and policy applying through the data tunnel between zone N and the data forwarding entity 226-N. At the end, all VAPs in zone 0 will stay up when any data tunnels are broken, all VAPs in zone 1 . . . N need to be torn down when corresponding data tunnel 1 . . . N are broken.

Figure 3:
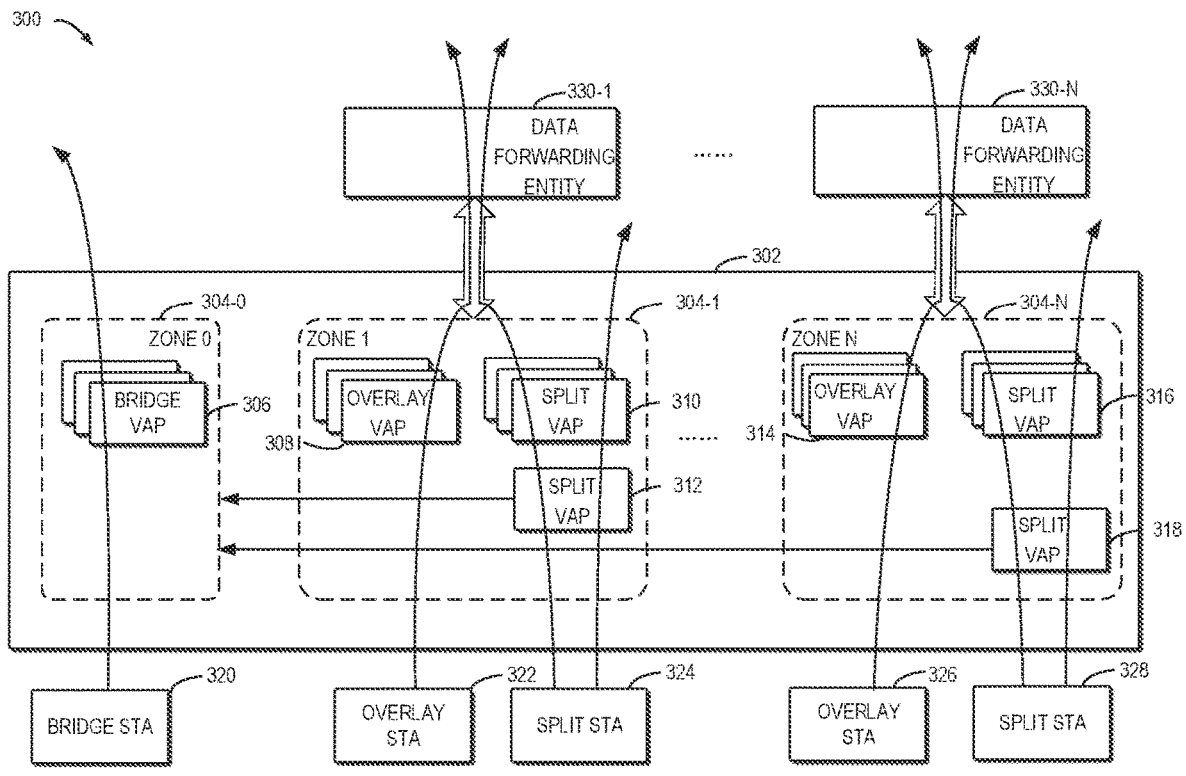
FIG. 3 illustrates another example of segmenting VAPs in each RF band according to implementations of the present disclosure.

In the example shown in FIG. 2, the split VAPs are assigned to the corresponding zones without further adjustment. For the split VAPs, when the data tunnel between the AP and the data forwarding entity is down, the split VAPs could stay up or be torn down. Because in such a situation, traffic which require to be forwarded by the data forwarding entity cannot pass. Nevertheless, traffic which is forwarded locally still can pass. Therefore, the split VAPs may stay up or be torn down based on configurations when the data tunnels between the AP and the data forwarding entities are down. If the configurations allow some split VAPs up when data tunnels are down, these VAPs will be moved to zone 0, as shown in FIG. 3. FIG. 3 illustrates another example 300 for segmenting VAPs in each RF band according to implementations of the present disclosure.

As shown in FIG. 3, an AP 302 communicates with a data forwarding entity 330-1, . . . , and a data forwarding entity 330-N. As discussed in FIG. 2, all the VAPs assigned to zone 304-1, zone 304-1, . . . , zone 304-N, also referred to as zone 0, zone 1, . . . , zone N. Moreover, zone 0 is a bridge zone, and zone 1, . . . , zone N are overlay zones.

A bridge STA 320 sends and receives traffic to a bridge VAP 306 in zone0 304-0. The overlay STA 322 sends and receives traffic via the overlay VAP 308 in zone 1 304-1, which communicates with a data forwarding entity 330-1 via a data tunnel. The split STA 324 sends and receives a part of traffic via the split VAP 310 in Zone1, which also communicates with a data forwarding entity 330-1 via the data tunnel. The rest of the traffic of the split STA 324 is bridged or routed locally in AP 302 without the extra data forwarding entity. Similarly, the overlay STA 326 sends and receives traffic via the overlay VAP 314 in Zone N, which communicates with a data forwarding entity 330-N via a corresponding data tunnel. The split VAP 328 sends and receives a part of traffic via the split VAP 316 in Zone N, which also communicates with the data forwarding entity 330-N via the data tunnel. The rest of the traffic of the split STA 328 is bridged or routed locally in AP without the extra data forwarding entity.

For the split VAPs, if the configurations allow them up when a data tunnel for the split VAPs is down, these VAPs will be moved to zone 0. If the configurations do not allow them up, these VAPs are assigned in the same zone with overlay VAPs which tunnel traffic to the same data forwarding entities. For example, in FIG. 3, a split VAP 310 in zone1 and a split VAP 316 in zone N are assigned in the same zone with the overlay zones based on the configurations for the split VAP 310 and the split VAP 316. The split VAP 312 in zone1 and the split VAP 318 in zone N are reassigned to the zone 0 based on the configurations for the split VAP 312 and the split VAP 318.

Next, the processing for the MBSSID groups is described. To gain the best RF performance, the AP should consume minimum MBSSID groups to gain benefits from the MBSSID feature. In some implementations, an AP can accommodate a maximum of 16 VAPs in each RF band, and it has 4 MBSSID groups. Therefore, each MBSSID group can accommodate a maximum of 4 VAPs, where one of them is TX-VAP, and the others are non-TX-VAPs in each MBSSID group. The minimum MBSSID groups are required for total VAPs in each RF band, and all VAPs will be assigned to these MBSSID groups to ensure good RF performance. For example, if an administrator configures 7 VAPs, it will consume 2 MBSSID groups at least. For this situation, 2 TX-VAPs will be used to advertise beacon frames for all 7 VAPs. The following equation (1) is used to calculate minimum MBSSID groups:

$$M = (N + m - 1)/m, \tag{1}$$

where M is MBSSID group count required for all VAPs in an RF band; N is total count of VAPs configured in an RF band, which sums the number of VAPs in each zone, so $N=N_0+N_1+ . . . +N_n$, $N_i$ being the number of the VAPs in the zone i, i=1, . . . , n, and zone i being an overlay zone; m is the maximum number of VAPs that an MBSSID group can accommodate, typically it may be 4.

Figure 4:
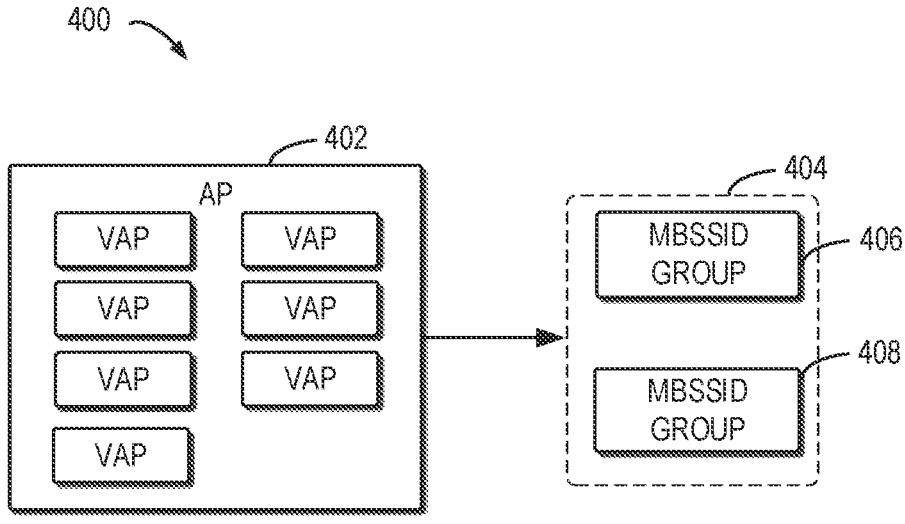
FIG. 4 illustrates an example for determining the MBSSID group according to implementations of the present disclosure.

FIG. 4 illustrates an example 400 for determining the MBSSID group according to implementations of the present disclosure. As shown in FIG. 4, an AP 402 includes 7 VAPs. Because the maximum number of VAPs that an MBSSID group can accommodate is 4, the minimum number of MBSSID groups is 2. For example, the set of MBSSID groups 404 includes two MBSSID groups, for example, an MBSSID group 406 and an MBSSID group 408.

The following describes how to assign VAPs in each zone to MBSSID groups and how to select TX-VAP for each MBSSID group. All VAPs in the overlay zones involve data forwarding entities for data forwarding according to VAP segmentation. These overlay zones are traversed, for example, zone 1, . . . , zone N as shown in FIG. 2 or FIG. 3. If VAPs in a zone can use up one or more MBSSID group, assign MBSSID group for these VAPs in the zone directly, and the rest of VAPs in the zone will be taken care of following operations along with VAPs in bridge zone that do not need data forwarding entities for data forwarding or do not need to be torn down when data forwarding entities are down. This operation ensures that VAPs impacted by a same data tunnel are placed in a same MBSSID group as these VAPs will behave the same when a specific data tunnel is down.

For the VAPs being assigned to an MBSSID group directly in the above operation, it is fine to select any VAP in the MBSSID as a TX-VAP because all VAPs in the zone are overlay or tunneled VAPs. If data tunnels between AP and corresponding data forwarding entities are broken, all these VAPs should be torn down, so it does not matter to select which one as a TX-VAP for one of these MBSSID groups. For example, the first VAP being placed in the MBSSID group is taken as TX-VAP. Further, the following equation (2) is used to determine the MBSSID groups used up.

$$M_{(1 \ldots n)} = N_{(1 \ldots n)}/m, \tag{2}$$

where $M_{(1 \ldots n)}$ is the MBSSID groups each zone uses up in above operation, and $N_{(1 \ldots n)}$ is the number of the VAPs in $Zone_{(1 \ldots n)}$. The following equation (3) is used to determine the number of unassigned VAPs in each zone.

$$R_{(1 \ldots n)} = N_{(1 \ldots n)} - M_{(1 \ldots n)} * m, \tag{3}$$

where $R_{(1 \ldots n)}$ is a number of VAPs that are unassigned in each zone, which need to be considered by following operations along with VAPs in bridge zone. Except consumed MBSSID groups in above step, there are $(M-M_{(1 \ldots n)})$ free MBSSID groups, and $(N_0+R_{(1 \ldots n)})$ unassigned VAPs, where No is the number of the VAPs in Zone 0 or the bridge zone.

Figure 5:
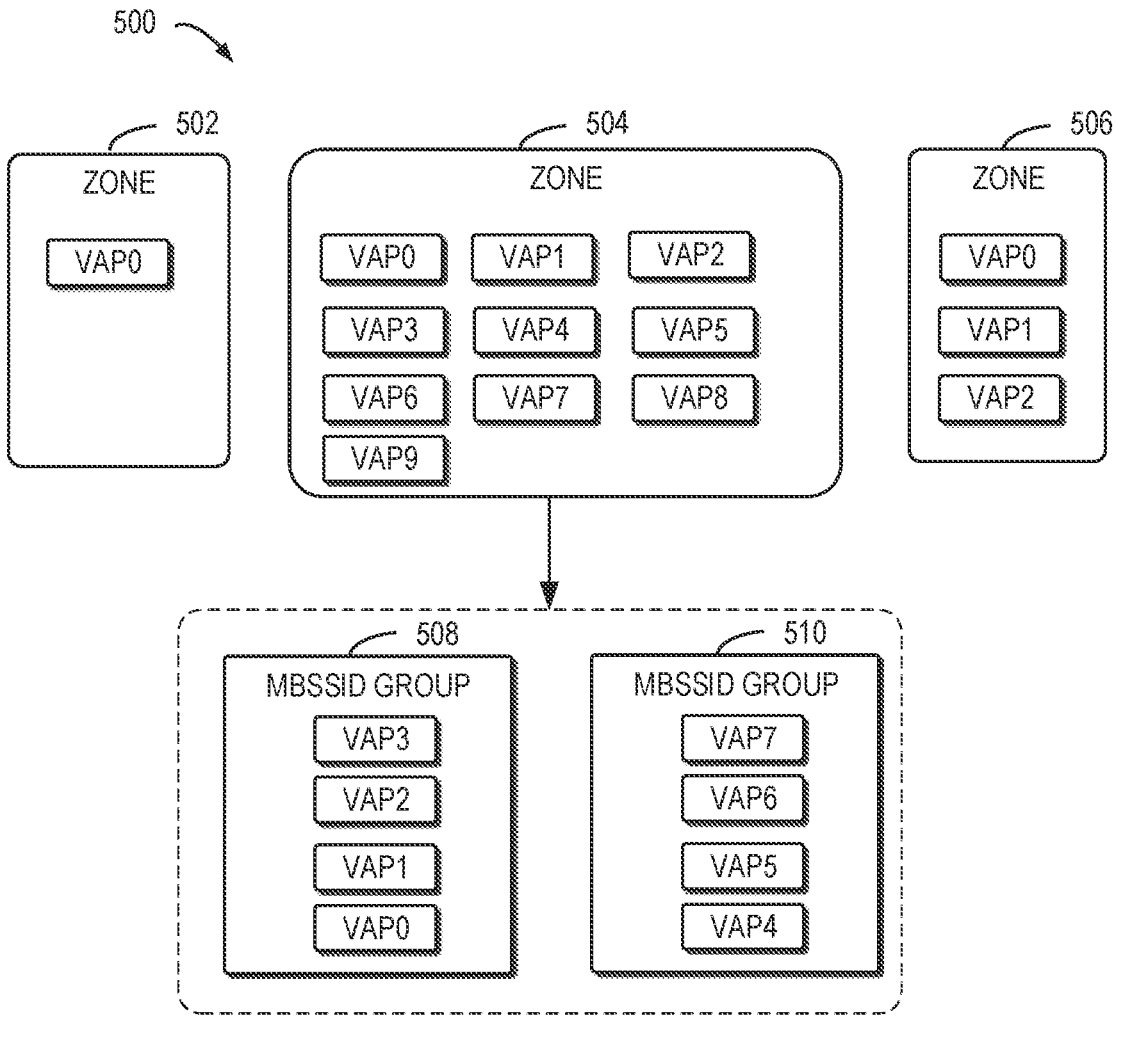
FIG. 5 illustrates an example of allocating VAPs to MBSSID groups according to implementations of the present disclosure.

FIG. 5 illustrates an example 500 for allocating VAP to MBSSID groups according to implementations of the present disclosure. As shown in FIG. 5, If zone 504, which is also referred as zone 1, has 10 VAPs, including vap0, vap1 . . . vap9, $M_1$ would be 2 (typically, m is 4), and 8 of them (vap0 . . . vap7) will consume 2 MBSSID groups, for example an MBSSID group 508 and an MBSSID group 509. For the two MBSSID groups, vap0 or vap4 is selected as TX-VAP in each MBSSID group. At this time, $R_1$ for zone 1 is 2. The remaining 2 VAPs (for example, vap8, vap9) will be taken care of in the following operation along with VAPs in zone 502, also referred to as zone 0.

Zone 506, also referred to as zone 2, has 3 VAPs. $M_2$ would be 0 as no VAPs will be assigned to an MBSSID group in this step. Thus, $R_2$ would be 3, all of them will be taken care by the following operation. At the end of this operation, unassigned VAPs in each zone R(1 . . . n) will be less than the maximum number m which is 4 typically. The MBSSID groups consumed in this operation are in final state, following operation will not touch these MBSSID groups.

Because VAPs in zone 0 are not impacted by data tunnel down according to the above VAP allocation, they are always up unless the administrator removes them from a configuration, so they are considered the most stable VAPs in AP. Based on such analysis, this disclosure tries to pick up one VAP in zone 0 then places it to each remaining MBSSID groups (except consumed MBSSID group in the above operations) and take it as TX-VAP. There are two possible situations: If there are enough VAPs in zone 0 to assign one VAP to each remaining MBSSID group, each remaining MBSSID group will have a TX-VAP in this operation, and remaining VAPs in zone 0 or the bridge zone will be taken care in next operation, wherein $R_0$ will be 0 or positive number in this case; If VAPs count in zone 0 or the bridge zone is less than remaining MBSSID groups, some of MBSSID groups will get a VAP from zone 0 and has TX-VAP assigned, and some of MBSSID groups will have no VAP assigned, where $R_0$ will be 0 in this case Next, the zones are ordered by a number of the remaining VAPs $R_{(0 \ldots n)}$ in each zone, then the VAPs in the zones are placed into MBSSID groups with free slots in order. MBSSID groups used up in above operations do not have free slots. Therefore, these MBSSID groups are in final state and will not be touched. MBSSID groups assigned VAPs from zone 0 or the bridge zone will have 3 or 4 free slots, and each zone has maximum 3 remaining VAPs, so each MBSSID group can accommodate all remaining VAPs of a specific zone.

Figure 6:
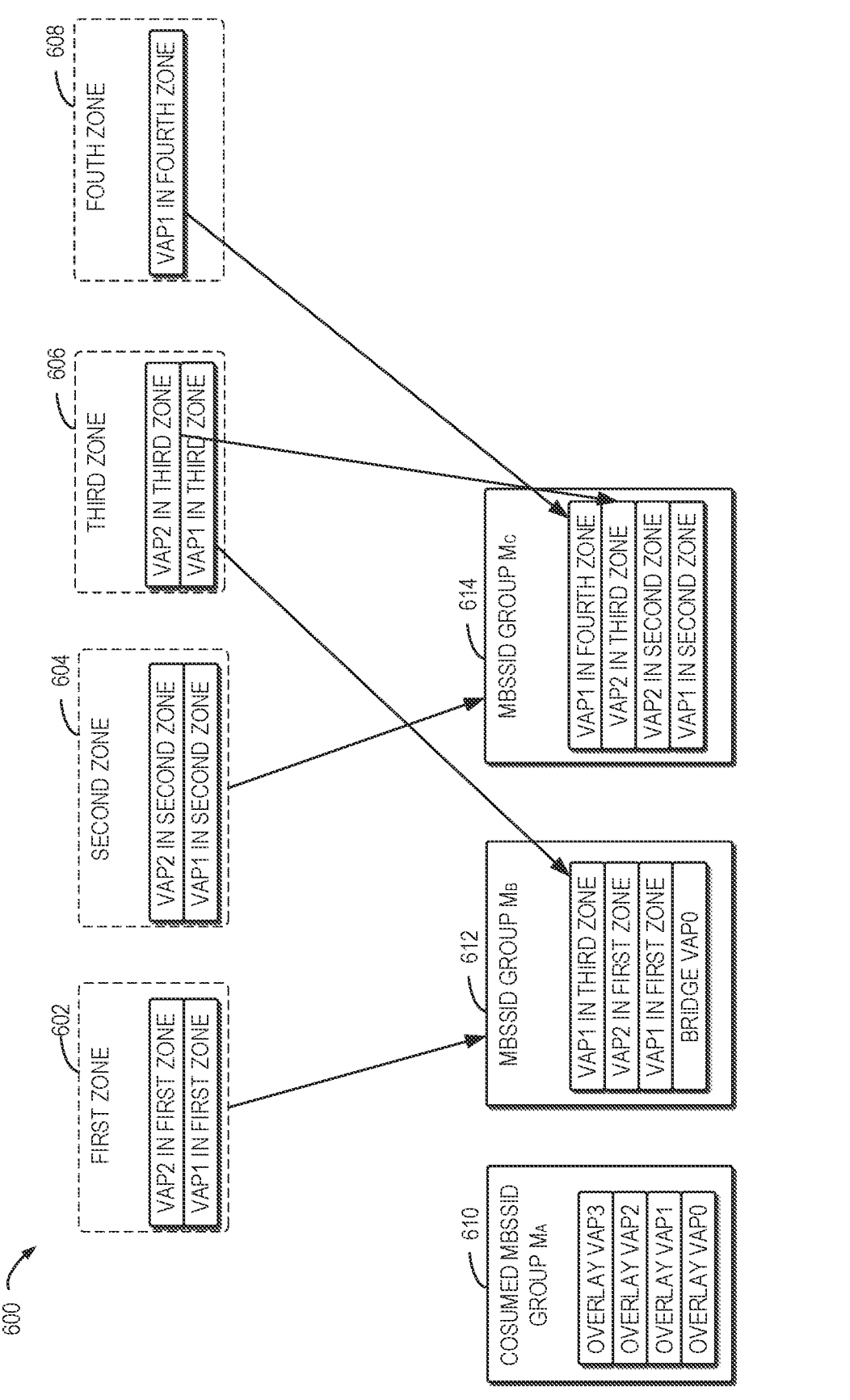
FIG. 6 illustrates another example of allocating VAPs to MBSSID groups according to implementations of the present disclosure.

FIG. 6 illustrates another example 600 for allocating VAPs to MBSSID group according to implementations of the present disclosure. In FIG. 6, there is a consumed MBSSID group $M_A$ 610. The consumed MBSSID group $M_A$ 610 has been used by the overlay VAPs from the same overlay zone. Any one of the overlay VAPs in the MBSSID group $M_A$ may be selected as the TX-VAP. There is only a bridge VAP0 in a bridge zone and the Bridge VAP0 from a bridge zone is assigned to an MBSSID group $M_B$ 612 as a TX-VAP. In this case, the MBSSID group $M_B$ 612 having three slots and an MBSSID group Mc 614 may be used to accommodate other VAPs from overlay zones. The zones are order by the number of the remaining VAP in each zone. As shown in FIG. 6, the number of the remaining VAP in a first zone 602 is 2, the number of the remaining VAP in a second zone 604 is 2, the number of the remaining VAP in third zone is 2, and the number of the remaining VAP in fourth zone is 1. Therefore, the order of the zone is the first zone 602, the second zone 604, the third zone 606, and the fourth zone 608. Because the MBSSID group $M_B$ 612 has enough room for all remaining VAPs in the first zone, all the remaining VAPs in the first zone are placed into the MBSSID group $M_B$ 612. Next, all the remaining VAPs in the second zone are placed into the MBSSID group Mc 614 because the MBSSID group Mc 614 has enough room to all VAPs in the second zone. The first VAP placed in the MBSSID group Mc is used as the TX-VAP. Then all MBSSID groups are already assigned the remaining VAPs once. Because the TX-VAP in each MBSSID group has already been selected, the remaining VAPs in zones may be placed into the MBSSID groups in any suitable ways. In one example, the unassigned VAPs are inserted in the free slot of the MBSSID groups $M_B$ and Mc one by one. For example, a VAP1 in the third zone is placed into the MBSSID group $M_B$, and a VAP 2 in the third zone and a VAP 1 in the fourth zone are placed in the MBSSID group Mc. In another example, for the unassigned VAPs, the remaining VAPs in one zone are placed into one MBSSID as much as possible. For example, the VAP in the third zone and the VAP2 in the third zone are placed into the MBSSID group Mc, and the VAP 1 in the fourth zone is placed into the MBSSID group $M_B$.

The following table 1 shows an example to explain above operations.

TABLE 1

| an example of the VAP allocation | | | |
|---|---|---|---|
| zone 0 (1 VAP)<br>VAP 0 | zone 1 (5 VAPs)<br>VAP1, VAP2,<br>VAP3, VAP4, VAP5 | zone 2 (3 VAPs)<br>VAP6, VAP7,<br>VAP8 | zone 3 (2 VAPs)<br>VAP9, VAP10 |
| step 1 | There are totally 11 VAPs, which will consume 3 MBSSID groups $M_A$, $M_B$, and $M_C$ | | |
| step 2 | Do not touch zone 0 | $M_A$ is consumed, place VAP1, VAP2, VAP3, VAP4 to $M_A$, VAP1 is TX-VAP. Take care remaining VAP5 in following steps $R_1 = 1$, $M_1 = 1$ | Do not consume MBSSID group $R_2 = 3$, $M_2 = 0$ | Do not consume MBSSID group $R_3 = 2$, $M_3 = 0$ |
| step 3 | At this point, $M_A$ is consumed and no Rooms for extra VAPs, 2 MBSSID groups $M_B$ and $M_C$ can accommodate VAPs.<br>Place vap0 in zone 0 to $M_B$, and take it as TX-VAP, $R_0$ is 0 now because all VAPs in zone 0 are assigned to MBSSID groups | | | |
| step 4 | Order zones by the number of the remaining VAP in each zone, in this example, the order would be zone 2 ($R_2 = 3$), zone 3 ($R_3 = 2$), zone 1 ($R_1 = 1$), zone 0 ($R_0 = 0$)<br>Then place 3 VAPs in zone 2 to $M_B$, so VAP6, VAP7, and VAP8 are placed in $M_B$, and VAP0 is TX-VAP in this group.<br>Then place VAP9 and VAP10 in zone 3 to $M_C$, VAP9 is TX-VAP as it is the first VAP placed in this group.<br>$M_B$ is full now, so place VAP5 in zone 1 to $M_C$ | | | |
| Result | VAP1, VAP2, VAP3, and VAP4 are placed in $M_A$, VAP1 is TX-VAP<br>VAP0, VAP6, VAP7, and VAP8 are placed in $M_B$, VAP0 is TX-VAP<br>VAP9, VAP10, and VAP5 are placed in $M_C$, VAP9 is TX-VAP<br>If data tunnel in zone 1 is down, it only has an impact to VAP1, VAP2, VAP3, VAP4, and VAP5.<br>If data tunnel in zone 2 is down, it only has an impact to VAP6, VAP7, VAP8<br>If data tunnel in zone 3 is down, it has an impact to VAP9, VAP10 and unnecessary VAP5 because VAP9 is TX-VAP in MBSSID group $M_C$. | | | |

FIG. 7 illustrates a flow chart of an example method 700 according to implementations of the present disclosure, and the method 700 is performed by an AP. At 702, the AP determines a plurality of virtual access points (VAPs) of the AP in a radio frequency (RF) band. For example, the AP 102 determines a plurality of virtual access points (VAPs) used in a radio frequency (RF) band. For example, the configuration information of the AP 102 is used to determine the plurality of VAPs used in the AP 102.

At 704, the AP divides, based on a set of data forwarding entities corresponding to overlay VAPs in the plurality of VAPs, the plurality of VAPs into a plurality of VAP zones. The plurality of VAP zones includes a bridge zone and one or more overlay zones. As an example, the AP 102 divides all the VAPs into the bridge zone 108 and overlay zone (s) 106. The overlay zone(s) 106 includes overlay VAPs and/or split VAPs involving the same data forwarding entity. The bridge zone 108 includes bridge VAPs. Also, STA traffic for each of the bridge VAPs is bridged or routed locally in the AP 102 without a data forwarding entity. Additionally, the bridge zone 108 also may include a split VAP, which is configured to allow it up when a data tunnel for the split VAP is down.

At 706, the AP determines a set of multiple basic service set identifier (MBSSID) groups for the plurality of VAPs. For example, the AP 102 determines the set of MBSSID groups 104. The network information about the VAPs assigned into one of the set of MBSSID groups may be transmitted by the TX-VAP selected from the VAPs. The determination for the set of MBSSID groups may be based on a number of the plurality of VAPs and a predefined number of VAPs included in one of the set of MBSSID groups.

At 708, the AP selects, from the bridge zone, a VAP for allocation to an MBSSID group of the set of MBSSID groups as a transmitted VAP (TX-VAP). For example, the AP 102 selects VAP0 in the bridge zone 108 and assigns the selected VAP0 in the bridge zone 108 to the MBSSID group 110 as a TX-VAP. If there are enough VAPs in bridge zone 108 to assign one VAP to each of the remaining MBSSID groups, each of the remaining MBSSID groups has one VAP from the bridge zone 108 as a TX-VAP. If there are not enough VAP in bridge zone 108 to assign one VAP to each of the remaining MBSSID groups, some of the remaining MBSSID groups will obtain VAPs from the bridge zone 108 as TX-VAPs, and some of the remaining MBSSID groups will have no VAPs from the bridge zone 108 as the TX-VAPs.

At 710, the AP transmits a beacon frame for the MBSSID group using the TX-VAP. As an example, after the TX-VAP is determined for the MBSSID group 110, the TX-VAP is used to transmit a beacon frame for the MBSSID group.

In this way, the AP can use minimum MBSSID groups, so it could maximize the benefits of MBSSID features and gain the best RF performance. Most important, this way can efficiently reduce unnecessary network down caused by data tunnel broken. When a data tunnel to a specific data forwarding entity is broken, this method can limit negative network impact mostly. In most cases, it can only have an impact on VAPs that involve this data forwarding entity for data forwarding.

FIG. 8 illustrates an example AP 800 according to implementations of the present disclosure. As shown in FIG. 8, the terminal device 800 comprises at least one processor 810, and a memory 820 coupled to the processor 810. The memory 820 stores instructions 822, 824, 826, 828, and 830 to cause the processor 810 to perform actions according to reference implementations of the present disclosure.

As shown in FIG. 8, the memory 820 stores instructions 822 to determine a plurality of virtual access points (VAPs) of the AP in a radio frequency (RF) band. As an example, the instruction 822 is executed by the processor 810 to determine a plurality of virtual access points (VAPs) of the AP in a radio frequency (RF) band. In some implementations, the plurality of VAPs is assigned to a set of MBSSID groups.

The memory 820 further stores instructions 824 to divide, based on a set of data forwarding entities corresponding to overlay VAPs in the plurality of VAPs, the plurality of VAPs into a plurality of VAP zones, the plurality of VAP zones including a bridge zone and one or more overlay zone. For example, the instruction 824 is executed by the processor 810 to divide, based on a set of data forwarding entities corresponding to overlay VAPs in the plurality of VAPs, the plurality of VAPs into a plurality of VAP zones, the plurality of VAP zones including a bridge zone and one or more overlay zone. In some implementations, each of the one or more overlay zone corresponds to a data forwarding entity, and the bridge zone does not have a corresponding data forwarding entity.

As shown in FIG. 8, the memory 820 further stores instructions 826 to determine a set of multiple basic service set identifier (MBSSID) groups for the plurality of VAPs. As an example, the instruction 826 is executed by the processor 810 to determine a set of MBSSID groups for the plurality of VAPs. In some implementations, in order to maximum the benefits of MBSSID feature, a minimum number of MBSSID groups are determined in this operation.

The memory 820 further stores instructions 828 to select, from the bridge zone, a VAP for allocation to an MBSSID group of the set of MBSSID groups as a transmitted VAP (TX-VAP). For example, the instruction 828 is executed by the processor 810 to select, from the bridge zone, a VAP for allocation to an MBSSID group of the set of MBSSID groups as a transmitted VAP (TX-VAP). In some implementations, if the bridge zone has VAPs, one of the VAPs in the bridge zone is selected and assigned to an MBSSID group of the set of MBSSID groups as a TX-VAP.

As shown in FIG. 8, the memory 820 further stores instructions 830 to transmit a beacon frame for the MBSSID group using the TX-VAP. As an example, the instruction 830 is executed by the processor 810 to transmit a beacon frame for the MBSSID group using the TX-VAP. Therefore, the AP 800 can use the selected TX-VAP to transmit a beacon frame and the STAs for the VAPs in the MBSSID group can receive the beacon frame.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that from a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method comprising:
   determining, by an access point (AP), a plurality of virtual access points (VAPs) of the AP in a radio frequency (RF) band;
   dividing, by the AP and based on a set of data forwarding entities corresponding to overlay VAPs in the plurality of VAPs, the plurality of VAPs into a plurality of VAP zones, the plurality of VAP zones including a bridge zone and one or more overlay zones;
   determining, by the AP, a set of multiple basic service set identifier (MBSSID) groups for the plurality of VAPs;
   selecting, by the AP and from the bridge zone, a VAP for allocation to an MBSSID group of the set of MBSSID groups as a transmitted VAP (TX-VAP); and
   transmitting, by the AP, a beacon frame for the MBSSID group using the TX-VAP.

2. The method according to claim 1, wherein dividing the plurality of VAPs into a plurality of VAP zones comprises:

determining that data forwarding for a VAP of the plurality of VAPs involves a data forwarding entity of the set of data forwarding entities; and assigning the VAP to an overlay zone of the one or more overlay zones corresponding to the data forwarding entity.

3. The method according to claim 2, wherein dividing the plurality of VAPs into a plurality of VAP zones further comprises:

determining that the assigned VAP is a split VAP, the split VAP tunneling a part of traffic to the data forwarding entity and forwarding the rest of traffic without using the data forwarding entity;

determining that a configuration of the split VAP allows the split VAP to continue to operate upon a data tunnel from the split VAP to the data forwarding entity being down; and reassigning the split VAP to the bridge zone.

4. The method according to claim 2, wherein dividing the plurality of VAPs into a plurality of VAP zones further comprises:

determining that the data forwarding for a VAP does not involve a data forwarding entity of the set of data forwarding entities; and assigning the VAP to the bridge zone.

5. The method according to claim 1, wherein determining a set of MBSSID groups for the plurality of VAPs comprises:

determining the set of MBSSID groups based on a number of the plurality of VAPs and a predefined number of VAPs included in one of the set of MBSSID groups.

6. The method according to claim 1, further comprising:

determining VAPs in an overlay zone of the one or more overlay zones are able to use up one or more MBSSID groups of the set of MBSSID groups;

assigning the VAPs in the overlay zone to the one or more MBSSID groups; and selecting one of the assigned VAPs in each of the one or more MBSSID groups as a TX-VAP.

7. The method according to claim 6, wherein selecting a VAP for allocation to an MBSSID group of the set of MBSSID groups as a transmitted VAP (TX-VAP) comprises:

determining a set of VAPs in the bridge zone;

determining remaining unused MBSSID groups of the set of MBSSID groups; and selecting one of the set of VAPs for allocation to one of the remaining unused MBSSID groups as a TX-VAP.

8. The method according to claim 7, wherein selecting one of the set of VAPs for allocation to one of the remaining unused MBSSID groups as a TX-VAP comprises:

determining that a first number of the set of VAPs is greater than or equal to a second number of the remaining unused MBSSID groups; and allocating one of the set of VAPs to each of the remaining unused MBSSID groups as the TX-VAP.

9. The method according to claim 8, further comprising:

ranking the bridge zone and the one or more overlay zones based on remaining VAPs in each zone of the bridge zone and the one or more overlay zones; and placing the remaining VAPs in each zone into the remaining unused MBSSID groups in order.

10. The method according to claim 7, wherein selecting one of the set of VAPs for allocation to one of the remaining unused MBSSID groups as a TX-VAP comprises:

determining that a first number of the set of VAPs is less than a second number of the remaining unused MBSSID groups; and allocating one of the set of VAPs to each of the first number of remaining unused MBSSID groups as the TX-VAP.

11. The method according to claim 10, further comprising:

ranking the one or more overlay zones based on remaining VAPs in each zone of the one or more overlay zones; and placing the remaining VAPs in each zone into the remaining unused MBSSID groups in order.

12. An access point (AP) comprising:

at least one processor;

a memory coupled to the at least one processor, the memory storing instructions to cause the at least one processor to:

determine a plurality of virtual access points (VAPs) of the AP in a radio frequency (RF) band;

divide, based on a set of data forwarding entities corresponding to overlay VAPs in the plurality of VAPs, the plurality of VAPs into a plurality of VAP zones, the plurality of VAP zones including a bridge zone and one or more overlay zones;

determine a set of multiple basic service set identifier (MBSSID) groups for the plurality of VAPs;

select, from the bridge zone, a VAP for allocation to an MBSSID group of the set of MBSSID groups as a transmitted VAP (TX-VAP); and transmit a beacon frame for the MBSSID group using the TX-VAP.

13. The access point according to claim 12, wherein the instructions to divide the plurality of VAPs into a plurality of VAP zones comprises instructions to cause the at least one processor to:

determine that data forwarding for a VAP of the plurality of VAPs involves a data forwarding entity of the set of data forwarding entities; and assign the VAP to an overlay zone of the one or more overlay zones corresponding to the data forwarding entity.

14. The access point according to claim 13, wherein the instructions to divide the plurality of VAPs into a plurality of VAP zones further comprise instructions to cause the at least one processor to:

determine that the assigned VAP is a split VAP, the split VAP tunneling a part of traffic to the data forwarding entity and forwarding the rest of traffic without using the data forwarding entity;

determine that a configuration of the split VAP allows the split VAP to continue to operate upon a data tunnel from the split VAP to the data forwarding entity being down; and reassign the split VAP to the bridge zone.

15. The access point according to claim 13, wherein the instructions to divide the plurality of VAPs into a plurality of VAP zones further comprise instructions to cause the at least one processor to:

determining that the data forwarding for a VAP does not involve a data forwarding entity of the set of data forwarding entities; and assign the VAP to the bridge zone.

16. The access point according to claim 12, wherein the instructions to determine a set of MBSSID groups for the plurality of VAPs comprise instructions to cause the at least one processor to:

determine the set of MBSSID groups based on a number of the plurality of VAPs and a predefined number of VAPs included in one of the set of MBSSID groups.

17. The access point according to claim 12, further comprising instructions to cause the at least one processor to:

determine VAPs in an overlay zone of the one or more overlay zones are able to use up one or more MBSSID groups of the set of MBSSID groups;

assign the VAPs in the overlay zone to the one or more MBSSID groups; and select one of the assigned VAPs in each of the one or more MBSSID groups as a TX-VAP.

18. The access point according to claim 17, wherein the instructions to select a VAP for allocation to an MBSSID group of the set of MBSSID groups as a transmitted VAP (TX-VAP) comprise instructions to cause the at least one processor to:

determine a set of VAPs in the bridge zone;

determine remaining unused MBSSID groups of the set of MBSSID groups; and select one of the set of VAPs for allocation to one of the remaining unused MBSSID groups as a TX-VAP.

19. The access point according to claim 18, wherein the instructions to select one of the set of VAPs for allocation to one of the remaining unused MBSSID groups as a TX-VAP comprise instructions to cause the at least one processor to:

determine that a first number of the set of VAPs is greater than or equal to a second number of the remaining unused MBSSID groups; and allocate one of the set of VAPs to each of the remaining unused MBSSID groups as the TX-VAP.

20. A non-transitory computer-readable medium comprising instructions stored thereon which, when executed by an access point (AP), cause the terminal device to:

determine a plurality of virtual access points (VAPs) of the AP in a radio frequency (RF) band;

divide, based on a set of data forwarding entities corresponding to overlay VAPs in the plurality of VAPs, the plurality of VAPs into a plurality of VAP zones, the plurality of VAP zones including a bridge zone and one or more overlay zones;

determine a set of multiple basic service set identifier (MBSSID) groups for the plurality of VAPs;

select, from the bridge zone, a VAP for allocation to an MBSSID group of the set of MBSSID groups as a transmitted VAP (TX-VAP); and transmit a beacon frame for the MBSSID group using the TX-VAP.

* * * * *